March 7, 1967  A. BRENNER  3,307,812
FISHING POLE HOLDER
Filed March 25, 1966

INVENTOR.
ABE BRENNER
BY
ATTORNEY.

United States Patent Office 3,307,812
Patented Mar. 7, 1967

3,307,812
FISHING POLE HOLDER
Abe Brenner, 255 W. 23rd St., New York, N.Y. 10010
Filed Mar. 25, 1966, Ser. No. 537,412
1 Claim. (Cl. 248—43)

This invention relates generally to a fishing pole holder and more particularly pertains to a portable fishing pole holder that is adapted to be clamped quickly and easily to any convenient support on a vessel or the like.

Fishing pole holders for use in boats have been proposed in the past to support a fishing pole thereby to free a fisherman's hands for other purposes, such as cleaning fish. For example, one such holder is disclosed in United States Patent No. 2,491,008, issued to G. Lake on December 13, 1949, and comprises an angulated pole-receiving socket attached to an inverted U-shaped bracket. Threadedly provided in one leg of the bracket is a screw having a relatively small element on the end thereof that is adapted to abut a part of a boat. Accordingly, the holder is fastened to the boat by mounting the bracket on a side thereof and tightening the screw to clamp the side between the aforementioned element and the other leg of the bracket. However, this type of construction suffers from many drawbacks.

One major disadvantage associated with the structure disclosed in the abovementioned patent resides in the fact that the socket is inclined to the horizontal thereby increasing the possibility of loss of the pole due to its easy removal by a tug on the fishing line. Another disadvantage associated with the prior art construction resides in the fact that a relatively small element is used to clamp the holder in place. Thus, the clamp is less secure than one in which the clamping forces are distributed over a relatively large bearing surface and when subjected to dislodging forces will tend to mar, scratch or damage the support surface to which it is secured.

Accordingly, the desideratum of the present invention is to provide a fishing pole holder that includes an erect pole-receiving tube rather than an inclined socket to prevent the removal of the pole therefrom by forces which are applied to the pole through the fishing line.

Another object of the present invention is to provide a fishing pole holder that includes clamping means having relatively non-marring large bearing surfaces thereby to securely clamp the fishing pole holder on a support member.

Figure 1:
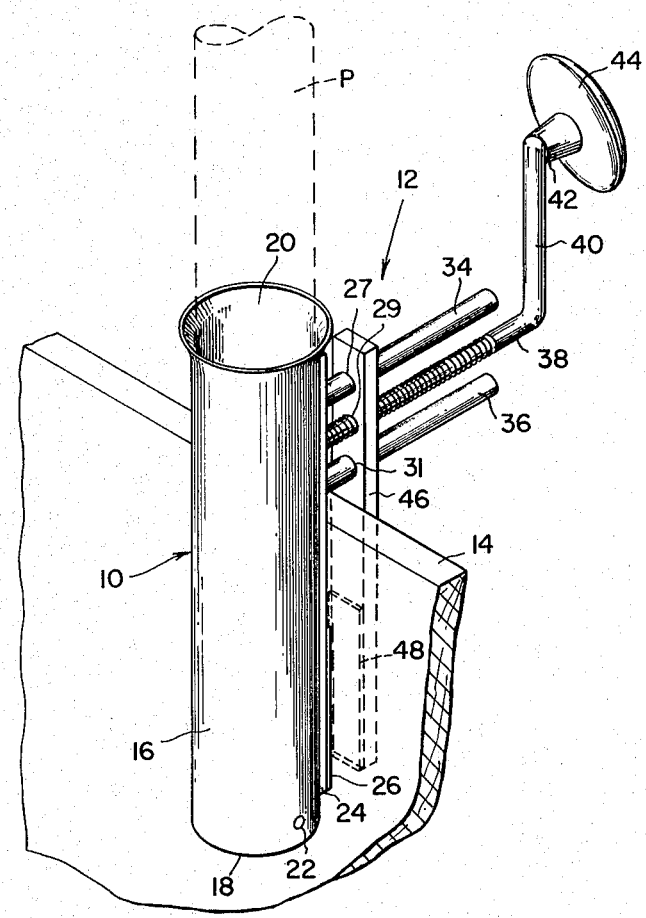
Figure 3:
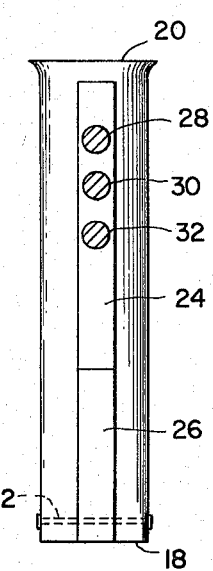
Figure 2:
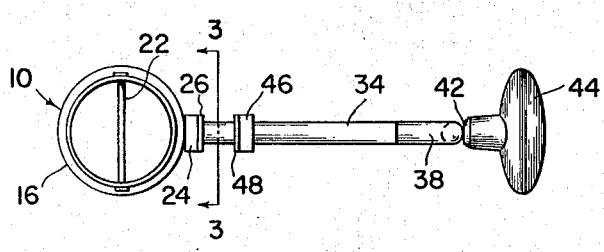

Other and further objects of this invention reside in the structures and arrangements hereinafter more fully described with reference to the accompanying drawings in which:

FIG. 1 is a perspective view of a fishing pole holder constructed according to the present invention, FIG. 2 is a top plan view of the holder shown in FIG. 1, and FIG. 3 is a sectional view of the fishing pole holder of the present invention taken along line 3—3 of FIG. 2.

The fishing pole holder of the present invention is illustrated in FIG. 1 and comprises an erect or upstanding pole-receiving tube, designated generally by the numeral 10, and a clamping structure, designated generally by the numeral 12, which is adapted to clamp the tube 10 to a support member 14. More particularly, the tube 10 includes an elongated circular wall 16 having an open bottom 18 and an open top 20. The wall 16 is flared outwardly adjacent the open top 20 to provide an enlarged entrance which facilitates the insertion of a fishing pole P (shown in phantom in FIG. 1) into the tube 10. Provided in the tube 10 adjacent the bottom 18 thereof is a diametrically extending pin 22 which is adapted to engage the end of the fishing pole P to prevent the fishing pole from passing through the tube. The tube 10 is sized to permit the handle of the fishing pole P to be easily inserted into or removed from the tube 10 by sliding the same relative to the tube 10.

The clamping structure 12 includes a stationary jaw in the form of an elongated member 24 which extends upward from the bottom of the tube 16 and which terminates in spaced relation to the top 20 thereof. A raised clamping surface 26 made of a yieldable high friction material, as rubber, is provided on the elongated member 24 and it extends upwardly from the bottom thereof for a distance slightly less than one-half of the height of the member 24. A row of three aligned apertures 28, 30 and 32 are provided in the member 24 in spaced relation to each other and to the top thereof.

Fixedly received in the apertures 28 and 32 are respective outwardly extending guide rods 34 and 36. Rotatably received and fixed in the aperture 30 is the end of a threaded shaft 38 which extends outwardly between and beyond the guide rods 34 and 36 and which terminates in a lateral arm 40. Connected to the end of the arm 40 by a swivel 42 is a handle 44. The threaded shaft 38, arm 40, swivel 42 and handle 44 all define to form an actuator crank handle. A movable jaw in the form of an elongated member 46 is provided with three apertures, 27, 29 and 31 adjacent the top edge thereof which are adapted to be aligned with the respective three apertures 28, 30 and 32 in the member 24. Slidingly received through the apertures 27 and 31 are the guide rods 34 and 36. Threadedly received through the aperture 29 is the threaded actuating shaft 38.

Provided adjacent the bottom of the elongated member 46 is a raised clamping surface 48 also made of a yieldable high friction material, as rubber. Accordingly, the stationary member 24 and the movable member 46 form the jaws of a clamp wherein the movable member 46 may be moved toward or away from the member 24 by rotating the shaft 38 of the crank handle in the appropriate direction by means of the handle 44; it being understood that the swivel 42 facilitates the rotation of the shaft 38 by the handle 44.

In operation, the shaft 38 is rotated so that the movable member 46 is moved toward and away from the tube 10 and, consequently, the stationary member 24. An upright support 14 which may comprise, for example, the side of a boat, is received between the members 46 and 24 and their flexible opposed clamping surfaces 48 and 26 respectively, it being understood that the tube 10 may be positioned on the inside of the boat. The shaft 38 is then rotated by means of the handle 44 to move the member 46 toward the member 24 until the respective clamping surfaces 26 and 48 abut and frictionally engage the respective opposed surfaces of the support 14 in tight frictional engagement therewith to securely affix the tube 10 to the support 14. In other words, the clamping structure 12 is operated to securely clamp the tube 10 to the support 14. It is to be noted that the raised surfaces 26 and 48 engage the support 14 over a relatively wide area thereby to provide a sturdy holder. The threaded shaft portion 38, which is positioned remote from the clamping jaws 24 and 46, provides a means for maintaining the movable jaw 48 parallel to the stationary jaw 24 during movement of the movable jaw.

The fishing pole P may then be inserted into the tube 10, such insertion being easily facilitated by the outwardly flared top portion 20 of the tube. The pole P is moved downwardly in the tube 10 until the end of the pole abuts the pin 22. Accordingly, the tube 10 will maintain the pole in an upright position thereby to free the fisherman's hands for other duties or work. When a fish is hooked, the pole P will begin to move about in the tube 10 thereby to notify the fisherman that a fish is on the line. The fisherman may then easily remove the pole P and bring the fish in in the conventional manner. Since the pole is erect, any force applied to the pole through the fishing line will be perpendicular to the plane of the pole and will simply cause the pole to flex rather than cause the pole to leave the tube 10.

Thus, an improved portable fishing pole holder has been described which includes an erect pole-receiving tube to prevent removal of the fishing pole therefrom by forces applied to the pole through the fishing line per se, such as when a fish is hooked on the line. The pole is securely clamped to the support member by relatively large area jaws that include clamping surfaces having a high coefficient of friction and which are formable so that they do not mare the surface of the supporting member.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claim appended hereto.

I claim:

A fishing pole support adapted to be secured to opposite sides of a supporting surface comprising
an adjustable clamp,
said clamp including a stationary jaw, a movable jaw and means to move said jaws toward and away from each other,
said stationary and movable jaws each having raised clamping surfaces of a yieldable high friction material,
said raised clamping surfaces being positioned in face-to-face relationship to frictionally engage the opposite sides of the supporting surface,
said moving means including a plurality of spaced guide means extending from said stationary jaw,
guide apertures defined in said movable jaw and slidingly receiving said guide means to guide the movement of said movable jaw toward and away from said stationary jaw,
a crank handle having a threaded shaft, the extreme end of which is rotatably connected to said stationary jaw and the threaded portion thereof threadedly engaging said movable jaw to threadingly move the same toward and away from said stationary jaw,
said threaded shaft being spaced remote from said raised clamping surfaces and maintaining said movable jaw parallel to said stationary jaw during movement of said movable jaw,
and an open-ended tube secured to said stationary jaw on a side thereof opposite said raised clamping surface.

References Cited by the Examiner
UNITED STATES PATENTS

| | | | |
|---|---|---|---|
| 841,560 | 1/1907 | Morris | 248—43 |
| 931,437 | 8/1909 | Larson | 248—40 X |
| 1,730,753 | 10/1929 | Belt | 248—226.2 |
| 1,996,303 | 4/1935 | McConnell | 248—99 |
| 2,055,842 | 9/1936 | Hailslip | 248—42 |
| 2,291,870 | 8/1942 | Blair et al. | 248—226.2 |
| 2,465,565 | 3/1949 | Agner | 248—42 |
| 2,619,308 | 11/1952 | Guestinger | 248—42 |
| 2,652,999 | 9/1953 | Lohmar | 248—42 |
| 2,946,546 | 7/1960 | Pokorny et al. | 248—40 |
| 2,952,432 | 9/1960 | Valdez | 248—42 |

CLAUDE A. LE ROY, *Primary Examiner.*